United States Patent
Schwab et al.

(10) Patent No.: US 7,111,591 B2
(45) Date of Patent: Sep. 26, 2006

(54) METHOD OF IMPROVING THE OPERATION OF COMBUSTION PARTICULATE FILTERS

(75) Inventors: Scott D. Schwab, Richmond, VA (US); Lawrence Joseph Cunningham, Mechanicsville, VA (US); John D. Morris, Richmond, VA (US); Joel A. Evans, Midlothian, VA (US)

(73) Assignee: Afton Chemical Corporation, Richmond, VA (US)

( * ) Notice: Subject to any disclaimer, the term of this patent is extended or adjusted under 35 U.S.C. 154(b) by 385 days.

(21) Appl. No.: 10/732,658

(22) Filed: Dec. 10, 2003

(65) Prior Publication Data

US 2005/0126157 A1   Jun. 16, 2005

(51) Int. Cl.
  *F02B 47/02*   (2006.01)
(52) U.S. Cl. .................. 123/25 R; 60/274; 60/297
(58) Field of Classification Search .............. 123/1 A, 123/25 R; 60/297, 311, 295; 44/280, 301, 44/302
See application file for complete search history.

(56) References Cited

U.S. PATENT DOCUMENTS

| | | |
|---|---|---|
| 2,818,417 A | 12/1957 | Brown et al. |
| 4,568,357 A | 2/1986 | Simon |
| 5,113,803 A | 5/1992 | Hollran et al. |
| 5,404,841 A | 4/1995 | Valentine |
| 5,535,708 A | 7/1996 | Valentine |
| 5,584,894 A | 12/1996 | Peter-Hoblyn et al. |
| 5,599,357 A | 2/1997 | Leeper |
| 5,669,938 A | 9/1997 | Schwab |
| 5,809,774 A | 9/1998 | Peter-Hoblyn et al. |
| 5,944,858 A | 8/1999 | Wallace |
| 2003/0196430 A1 | 10/2003 | Brown et al. |

FOREIGN PATENT DOCUMENTS

| | | |
|---|---|---|
| EP | 0 466 512 B1 | 6/1994 |
| EP | 1215272 A1 * | 6/2002 |
| WO | WO 9728358 A1 * | 8/1997 |

* cited by examiner

*Primary Examiner*—Stephen K. Cronin
*Assistant Examiner*—Hyder Ali
(74) *Attorney, Agent, or Firm*—Dennis H. Rainear

(57) ABSTRACT

A method is disclosed that improves the operation of fuel combustion systems utilizing particulate filters. The method includes the combustion of a fuel emulsion in a fuel combustion system having a particulate filter. The fuel emulsion may comprise water and a fuel with the emulsion including a metal-containing compound, such as, for example, a manganese-containing compound.

28 Claims, 4 Drawing Sheets

Engine running on base fuel only (no water added). Four separate runs shown.

Engine running on base fuel only (no water added). Four separate runs shown.

Engine running on base fuel with 10% emulsified water (no additive). Two separate runs shown.

Engine running on base fuel with 10% emulsified water and 10 mg/liter Mn (from MMT).

Two separate runs shown.

Engine running on base fuel with 10% emulsified water and 10 mg/liter Mn
(from manganese acetate tetrahydrate). Single run shown.

METHOD OF IMPROVING THE OPERATION OF COMBUSTION PARTICULATE FILTERS

Particulate matter emissions can build up in particulate filter emissions systems thereby reducing a filter's effectiveness. Over time, this build up of particulate matter within the particulate filter trap will cause increased backpressure in, for example, a fuel combustion system. Pursuant to the present invention, this backpressure may be reduced as a result of the combustion in the system of fuel emulsion, for instance water and a fuel, with the fuel emulsion including a metal-containing compound, such as, for example, a manganese-containing compound.

BACKGROUND

Diesel fuel combustion systems raise many challenges for emissions control. Conventional strategies for reducing particulate, hydrocarbon, and nitrogen oxide ($NO_x$) emissions include optimizing fuel injection and air motion, effective fuel atomization at varying loads, control of time of fuel injection, minimization of parasitic losses in combustion chambers, low sac volume or valve cover orifice nozzles for direct injection, reducing lubrication oil contributions, and rapid engine warm up.

Diesel particulate traps such as catalyzed diesel particulate filters (C-DPFs) and continuously regenerating technology diesel particulate filters (CRT-DPFs) have been developed which employ ceramic or metal filters. Thermal and catalytic regeneration can burn out the trapped material. New particulate standards may necessitate such traps. Fuel composition, including sulfur and aromatic content, and the burning of lubricant can contribute to increased particulate emissions. Catalysts have been developed for diesel fuels which are very effective in oxidizing the organic portion of the particulate.

It is also recognized that dispersions of water in diesel fuel may serve to reduce undesirable diesel emissions such as carbon monoxide, particulates and $NO_x$. See, e.g., U.S. Pat. Nos. 5,669,938; 5,404,841; 5,535,708; 5,584,894; 5,809,774. Notwithstanding all of the foregoing teachings, particulate matter still builds up in diesel particulate filters. This build up, over time, creates backpressure on the combustion system, thereby decreasing the efficiency and power of the system. Additionally, the build up of particulate within a particulate filter system also reduces the efficiency of that system as an emissions control device. The built up particulate may block surfaces within the filter that may otherwise catalyze the break down of undesirable emissions by-products.

U.S. Patent Application 2003/0196430 A1 teaches a process for reducing the level of pollutants in the exhaust of a diesel engine.

DETAILED DESCRIPTION

Figure 1:
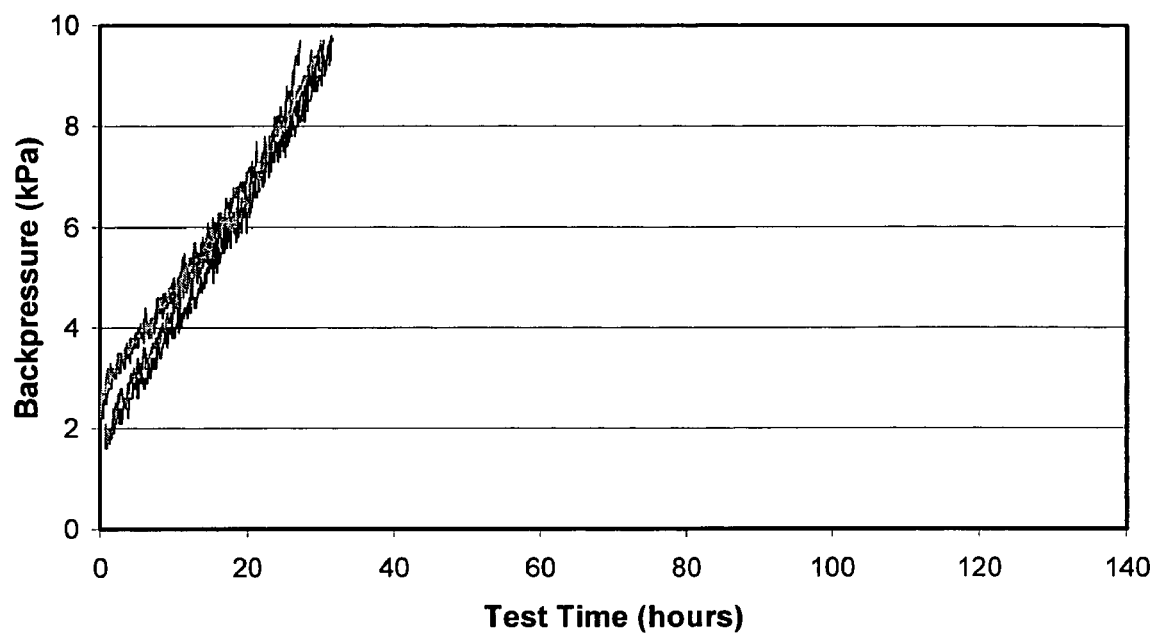
FIGS. 1–4 are graphs demonstrating tests measuring engine backpressure.

The present invention includes a method for improving the operation of a particulate filter that is used in connection with a fuel combustion system. As described herein, the method includes the step of providing a fuel combustion system comprising a particulate filter. The method further includes providing a fuel emulsion comprising water and a fuel, the fuel emulsion comprising a metal-containing compound such as a manganese-containing compound. The method further includes combusting the fuel emulsion in the fuel combustion system whereby a particulate emission is produced, wherein combustion of the fuel emulsion results in improved operation of the combustion system when compared with the operation of a combustion system combusting a fuel emulsion without a metal-containing compound.

Also disclosed herein is a method of reducing backpressure increase caused by the combustion of a fuel in a fuel combustion system that includes a particulate filter. The method includes providing a fuel combustion system comprising a particulate filter. The method also includes providing a fuel emulsion comprising water and a fuel, the fuel emulsion comprising a metal-containing compound. The method also includes combusting the fuel emulsion in the fuel combustion system to produce particulate emissions, wherein the combustion of the fuel emulsion reduces the backpressure increase caused by the accumulation of particulates on or in the particulate filter as compared with the backpressure increase caused by the combustion of a fuel emulsion without a metal-containing compound.

By "fuels" herein is meant one or more fuels suitable for use in the operation of combustion systems include diesel fuel, jet fuel, kerosene, synthetic fuels, such as Fischer-Tropsch fuels, liquid petroleum gas, fuels derived from coal, natural gas, propane, butane, unleaded motor and aviation gasolines, and so-called reformulated gasolines which typically contain both hydrocarbons of the gasoline boiling range and fuel-soluble oxygenated blending agents, such as alcohols, ethers and other suitable oxygen-containing organic compounds. Oxygenates suitable for use include methanol, ethanol, isopropanol, t-butanol, mixed $C_1$ to $C_5$ alcohols, methyl tertiary butyl ether, tertiary amyl methyl ether, ethyl tertiary butyl ether and mixed ethers. Oxygenates, when used, will normally be present in the base fuel in an amount below about 25% by volume, and preferably in an amount that provides an oxygen content in the overall fuel in the range of about 0.5 to about 5 percent by volume. Other fuels that are useful are gasoline, bunker fuel, coal dust, crude oil, refinery "bottoms" and by-products, crude oil extracts, hazardous wastes, yard trimmings and waste, wood chips and saw dust, agricultural waste or tillage, plastics and other organic waste and/or by-products, and mixtures thereof, and emulsions, suspensions, and dispersions thereof in water, alcohol, or other carrier fluids.

By "diesel fuel" herein is meant one or more fuels selected from the group consisting of diesel fuel, kerosene, biodiesel, biodiesel-derived fuel, synthetic diesel and mixtures thereof and other products meeting the definitions of ASTM D975. These diesel fuels are comprised in general of mixtures of hydrocarbons which fall within the distillation range of about 160 to about 370° C. Such diesel fuels are frequently referred to as "middle distillate fuels" since they comprise the fractions which distill after gasoline.

In an example, applicable middle distillate fuels are those characterized by having the following distillation profile:

|  | ° F. | ° C. |
|---|---|---|
| IBP | 250–500 | 121–260 |
| 10% | 310–550 | 154–288 |
| 50% | 350–600 | 177–316 |

|     | °F.     | °C.     |
| --- | ------- | ------- |
| 90% | 400–700 | 204–371 |
| EP  | 450–750 | 232–399 |

Diesel fuels having a clear cetane number (i.e., a cetane number when devoid of any cetane improver such as an organic nitrate) in the range of 30 to 65 may also be used. In another example are those fuels in which the clear cetane number is in the range of 40 to 50. Often, the sulfur content of the diesel fuel will be less than 5000 ppm, and in low-sulfur fuels, the sulfur content will be less than 500 ppm, and in very low sulfur fuels less than 50 ppm. Fuels having relatively high sulfur content are currently impractical for use with catalytically enhanced after treatment systems, but are nevertheless useful within the scope of the present invention.

The term "fuel emulsion" is meant to include any of the hydrocarbon fuels emulsified as to include an aqueous phase. Exemplary emulsions are of the water-in-oil type having a dispersed aqueous phase, typically with about 1 to about 40 weight percent water. Emulsions with a dispersed oil phase are also contemplated and will typically have higher aqueous phase contents, e.g., up to about 50%. The emulsion can be stabilized or unstabilized (e.g., without an emulsifying agent), as might be necessary for regulatory, marketing, or storage or operating purposes. The fuel emulsions herein can also be emulsions of alcohol, such as but not limited to ethanol in the fuel and emulsions of the fuel in ethanol or other alcohols. In addition to or instead of ethanol, other oxygenates could be used in the emulsion.

The metal-containing compound can be a manganese-containing compound herein including elemental and ionic manganese, precursors thereof, and mixtures of metal compounds containing manganese. The manganese-containing compounds may be either inorganic or organic. Also effective is the generation, liberation or production in situ of manganese or manganese ions.

Inorganic compounds can include by example and without limitation fluorides, chlorides, bromides, iodides, oxides, nitrates, sulfates, phosphates, nitrides, hydrides, hydroxides, carbonates and mixtures thereof. Manganese sulfates and phosphates will be operative and may, in certain fuels and combustion applications, not present unacceptable additional sulfur and phosphorus combustion byproducts.

Exemplary organometallic compounds herein include compounds having stabilizing ligands containing functional groups such as alcohols, aldehydes, ketones, esters, anhydrides, sulfonates, phosphonates, chelates, phenates, crown ethers, carboxylic acids, amides, acetyl acetonates, and mixtures thereof.

Organometallic compounds include manganese compounds with alcohols, aldehydes, ketones, esters, anhydrides, sulfonates, phosphonates, chelates, phenates, crown ethers, naphthenates, carboxylic acids, amides, acetyl acetonates, and mixtures thereof as part of the ligand systems.

Examples of manganese containing organometallic compounds are manganese tricarbonyl compounds. Such compounds are taught, for example, in U.S. Pat. Nos. 4,568,357; 4,674,447; 5,113,803; 5,599,357; 5,944,858 and European Patent No. 466 512 B1.

Suitable manganese tricarbonyl compounds which can be used include cyclopentadienyl manganese tricarbonyl, methylcyclopentadienyl manganese tricarbonyl, dimethyl-cyclopentadienyl manganese tricarbonyl, trimethylcyclopentadienyl manganese tricarbonyl, tetramethylcyclopentadienyl manganese tricarbonyl, pentamethylcyclopentadienyl manganese tricarbonyl, ethylcyclopentadienyl manganese tricarbonyl, diethylcyclopentadienyl manganese tricarbonyl, propylcyclopentadienyl manganese tricarbonyl, isopropylcyclopentadienyl manganese tricarbonyl, tert-butylcyclopentadienyl manganese tricarbonyl, octylcyclopentadienyl manganese tricarbonyl, dodecylcyclopentadienyl manganese tricarbonyl, ethylmethylcyclopentadienyl manganese tricarbonyl, indenyl manganese tricarbonyl, and the like, including mixtures of two or more such compounds. In one example are the cyclopentadienyl manganese tricarbonyls which are liquid at room temperature such as methylcyclopentadienyl manganese tricarbonyl, ethylcyclopentadienyl manganese tricarbonyl, liquid mixtures of cyclopentadienyl manganese tricarbonyl and methylcyclopentadienyl manganese tricarbonyl, mixtures of methylcyclopentadienyl manganese tricarbonyl and ethylcyclopentadienyl manganese tricarbonyl, and the like.

Preparation of such compounds is described in the literature, for example, U.S. Pat. No. 2,818,417, the disclosure of which is incorporated herein in its entirety.

The metal-containing compound can be either fuel soluble, water soluble or alcohol soluble or otherwise soluble in the aqueous or alcohol phase. Accordingly, it may be added to the base fuel, the aqueous component, the alcohol component, or to the emulsion. It is possible for the emulsion described herein to contain both fuel soluble and water soluble manganese-containing compounds.

By "metal-containing compound" herein is meant a compound containing one or more metals selected from the group consisting of Li, Na, K, Mg, Ca, Sr, Ba, Mn, Fe, Pt, Pd, Rh, Mo, Sc, Ti, Va, Cr, Co, Ni, Cu, Zn, Ru, Ag, Cd, La, Hf, Ta, W, Re, Os, Ir, Au, Pb, Ga, Al, Ge, In, Sn, Ce, Th, U, Pu, and Yb. Manganese-containing compounds are particularly effective herein.

The amount or concentration of the metal-containing compound in the emulsion may be selected based on many factors including the specific attributes of the particular diesel fuel. The treatment rate of, for example, the manganese-containing compound can be in excess of 100 mg of manganese/liter, up to about 50 mg/liter, and about 1 to about 30 mg/liter. The treat rate must be sufficient to improve the operation of the particulate filter of the combustion system. By the term "improve" or "improving" is meant that the particulate filter will operate better when the emulsion described herein is combusted in the combustion system as compared with the combustion in that system of a metal-free emulsion. The improvements may include, but are not limited to, more efficient operation of the system by minimizing backpressure increase and less frequent regeneration of the particulate filter.

Other additives may be included within the fuel compositions and emulsion described herein provided they do not adversely affect the efficient operation of the particulate filter, such as a diesel particulate filter. Thus, use may be made of one or more of such components as corrosion inhibitors, antioxidants, anti-rust agents, detergents and dispersants, fuel lubricity additives, demulsifiers, dyes, inert diluents, cold flow improvers, conductivity agents, metal deactivators, stabilizers, antifoam additives, de-icers, biocides, odorants, drag reducers, combustion improvers, oxygenates and like materials. A particularly useful additive is selected from the group consisting of ammonium nitrate, other ammonium salts, azide compounds, nitrate esters, nitramines, and nitro compounds. The additional additives recited herein may also be used individually or in combinations as additive packages in the fuel or in the emulsion.

Oxygenates suitable for use herein include methanol, ethanol, isopropanol, t-butanol, mixed $C_1$ to $C_5$ alcohols, methyl tertiary butyl ether, tertiary amyl methyl ether, ethyl tertiary butyl ether, mixed ethers, glymes and diglymes. Oxygenates, when used, will normally be present in the base fuel in an amount below about 25% by volume, and often in an amount that provides an oxygen content in the overall fuel in the range of about 0.5 to about 5 percent by volume. Oxygenates herein can be soluble or miscible in either phase or can be emulsified.

Combustion systems that may benefit from combustion of the emulsion herein include any system that, as a result of the combustion of a hydrocarbonaceous fuel, has emissions of carbon particulate matter and that includes a particulate filter such as a diesel particulate filter. By "combustion system" herein is meant any and all internal and external combustion devices, machines, boilers, incinerators, evaporative burners, plasma burner systems, plasma arc, stationary burners and the like which can combust or in which can be combusted a hydrocarbonaceous fuel and that have an emissions control system that includes a particulate filter. The combustion units further include any and all burners or combustion devices, including for example and without limitation herein, stationary burners, waste incinerators, diesel fuel burners, gasoline fuel burners, power plant generators, power plant furnaces, and the like.

There are multiple types of particulate filters such as diesel particulate filters (DPFs). Conventional, uncatalyzed DPFs are a well-known technology that has been used for many years. In operation, combustion byproducts such as particulates and soot are trapped and then oxidized, or "burned off". "Catalyzed diesel particulate filters" (C-DPFs) are filters incorporating a catalyst on or within the filter substrate that are adapted to reduce the oxidation temperature of the combustion byproducts captured in the filter. C-DPFs currently include cordierite or silicon carbide monolithic type filters. A "continuously regenerating technology diesel particulate filter" (CRT-DPF) is a system where the catalyst is a separate, flow-through substrate that precedes the diesel particulate filter in the exhaust passageway.

EXAMPLE

Fuel was blended in a 300-gallon stainless steel tote. For emulsified fuels, water was added to the tote and initially mixed with an air-powered blender. The blender was allowed to run for several hours to properly mix the emulsion. Once the emulsion was formed, the blender was removed and two pumps were used to continuously circulate the fuel emulsion for the duration of the test. The pumping loop pulled the mix from the bottom of the tote and returned it to the top assuring the water stayed in suspension. Fuel was delivered to and returned from the engine through separate pipes connected to the tote.

All tests were performed on a Yanmar diesel generator engine, rated 15 kilowatts at 1800 rpm. The engine was run continuously at 1800 rpm and 12 kilowatts for the duration of each test. A catalyzed diesel particulate filter (CDPF) was mounted approximately three feet from the exhaust manifold outlet. The CDPF was cleaned prior to each test by back flowing compressed air through each cell until all the ash and soot were removed. Engine run conditions produced an exhaust temperature of approximately 370° C. at the CDPF inlet. Backpressure caused by soot and ash loading of the CDPF was measured with a delta pressure transducer.

Figure 2:
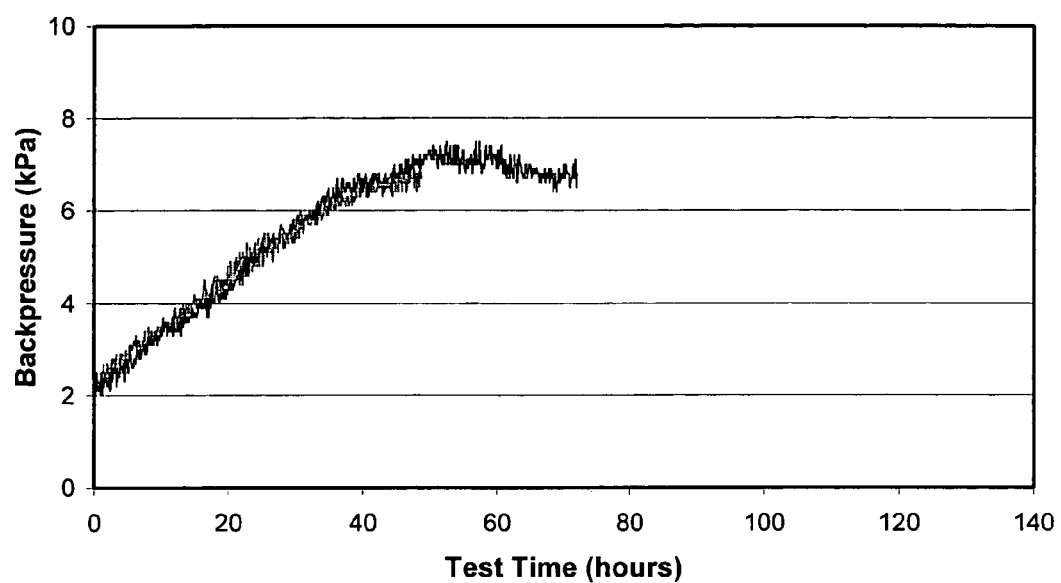
Figure 3:
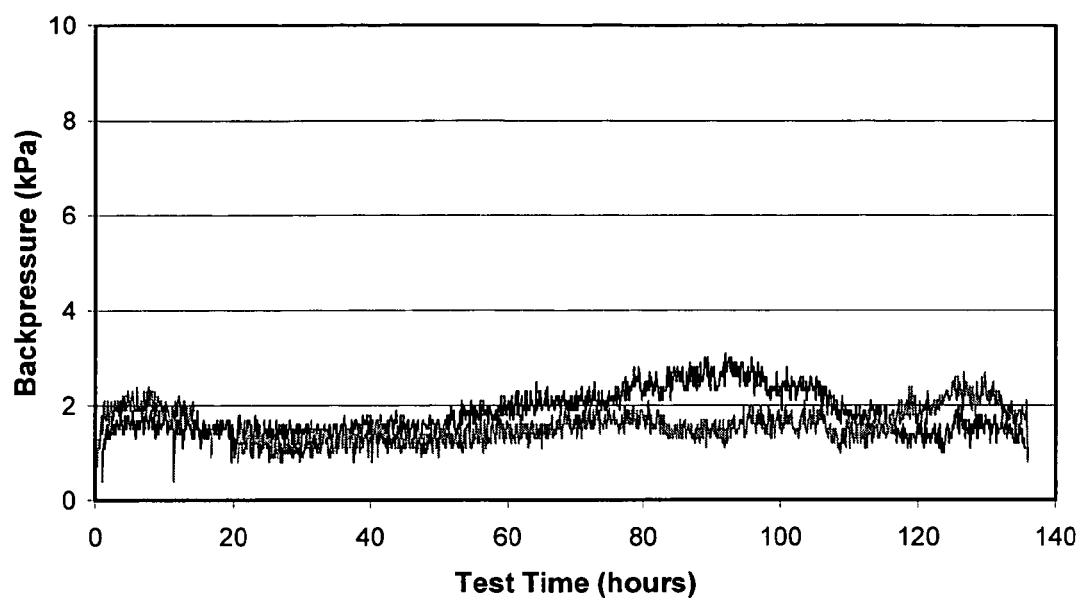
Figure 4:
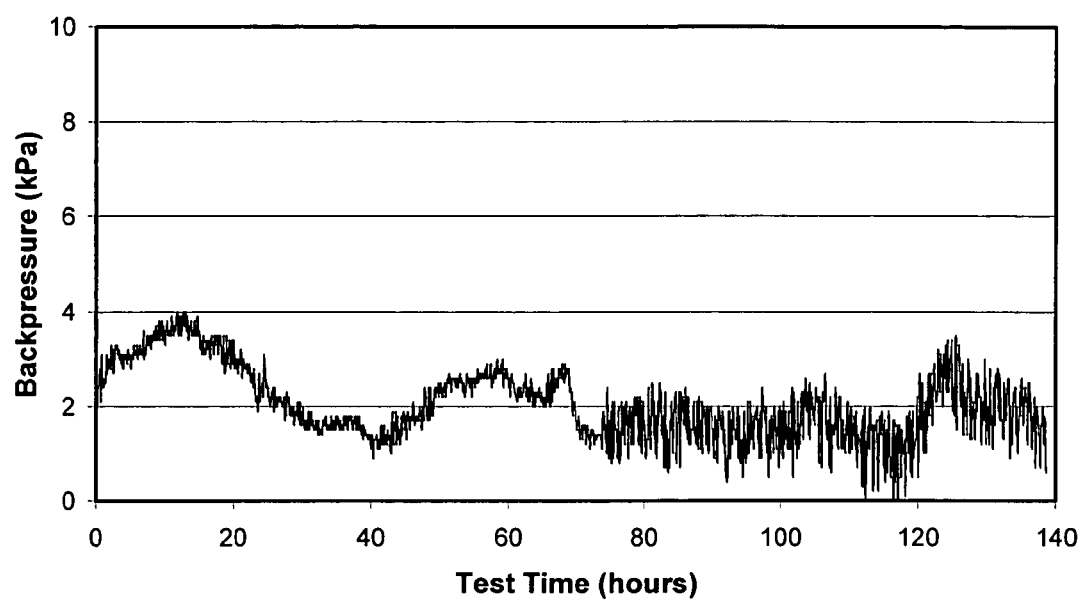

The results of the four different tests are recorded in FIGS. 1–4. Each graph measures and displays backpressure as a function of test time. In FIG. 1, the engine was run on base fuel only (no water added). Four separate runs are shown. In FIG. 2, the engine was run on base fuel with 10% emulsified water. Two separate runs are shown. In FIG. 3, the engine was run on base fuel with 10% emulsified water and 10 mg/liter manganese (from MMT). Two separate runs are shown. In FIG. 4, the engine was run on base fuel with 10% emulsified water and 10 mg/liter manganese (from manganese acetate tetrahydrate introduced in the water).

As is evident from the test results, the use of an emulsion versus a diesel fuel without any aqueous component shows some improved/reduced backpressure as a result of particulate build up in a diesel particulate filter. Nevertheless, it is not until the emulsion includes the metal-containing compound such as a manganese-containing compound that the backpressure is reduced to the point where, at least with respect to the test limits, a steady pressure is obtained without any increasing trend. This reduced backpressure is evidence of reduced particulate build up within the diesel particulate filter. With respect to certain types of particulate filters, especially catalyzed diesel particulate filters, this means that the filter is free or at least relatively more free to have surface for the catalyzed components of the system to reduce emissions from the combustion system. This reduction in build up also cuts down the frequency of regeneration of the filter.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as formation of the organometallic compound) or in forming a desired composition (such as an additive concentrate or additized fuel blend). It will also be recognized that the additive components can be added or blended into or with the base fuels individually per se and/or as components used in forming preformed additive combinations and/or sub-combinations. Accordingly, even though the claims hereinafter may refer to substances, components and/or ingredients in the present tense ("comprises", "is", etc.), the reference is to the substance, components or ingredient as it existed at the time just before it was first blended or mixed with one or more other substances, components and/or ingredients in accordance with the present disclosure. The fact that the substance, components or ingredient may have lost its original identity through a chemical reaction or transformation during the course of such blending or mixing operations or immediately thereafter is thus wholly immaterial for an accurate understanding and appreciation of this disclosure and the claims thereof.

At numerous places throughout this specification, reference has been made to a number of U.S. patents, published foreign patent applications and published technical papers.

All such cited documents are expressly incorporated in full into this disclosure as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

Patentee does not intend to dedicate any disclosed embodiments to the public, and to the extent any disclosed modifications or alterations may not literally fall within the scope of the claims, they are considered to be part of the invention under the doctrine of equivalents.

What is claimed is:

1. A method of improving the operation of a fuel combustion system having a particulate filter, the method comprising the steps of:
   providing a fuel combustion system comprising a particulate filter,
   providing a fuel emulsion comprising water and a fuel, the fuel emulsion comprising a manganese-containing compound,
   wherein the fuel emulsion is free of a platinum group metal selected from the group consisting of platinum, palladium, rhodium, ruthenium, osmium and iridium,
   combusting the fuel emulsion in the fuel combustion system whereby a particulate emission is produced,
   wherein combustion of the fuel emulsion results in improved operation of the particulate filter when compared with the operation of the particulate filter with combustion of a fuel emulsion without a manganese-containing compound.

2. The method of claim 1, wherein the fuel is a diesel fuel, the fuel combustion system is a diesel fuel combustion system, and the particulate filter is a diesel particulate filter.

3. The method of claim 1, wherein the fuel emulsion comprises about one to about 40 weight percent water.

4. The method of claim 1, wherein the fuel emulsion comprises a fuel in water.

5. The method of claim 1, wherein the fuel emulsion comprises a water in a fuel.

6. The method of claim 1, wherein the metal manganese-containing compound is water soluble.

7. The method of claim 1, wherein the metal manganese-containing compound is fuel soluble.

8. The method of claim 2, wherein the diesel fuel is selected from the group consisting of kerosene, biodiesel, biodiesel—derived fuel, and synthetic diesel fuel.

9. The method of claim 2, wherein the diesel fuel contains less than about 500 ppm of sulfur.

10. The method of claim 1, wherein the metal-containing compound is an inorganic manganese-containing compound.

11. The method of claim 10, wherein the inorganic manganese compound is selected from the group consisting of fluorides, chlorides, bromides, iodides, oxides, nitrates, sulfates, phosphates, nitrides, hydrides, hydroxides carbonates, and mixtures thereof.

12. The method of claim 1, wherein the metal manganese-containing compound is an organometallic compound.

13. The method of claim 12, wherein the organometallic compound is a compound comprising stabilizing ligands containing functional groups selected from the group consisting of alcohols, aldehydes, ketones, esters, anhydrides, sulfonates, phosphonates, chelates, phenates, crown ethers, carboxylic acids, amides, acetyl acetonates, and mixtures thereof.

14. The method of claim 2, wherein the metal manganese-containing compound comprises about 1 to about 30 mg metal/liter of the diesel fuel.

15. The method of claim 12, wherein the organometallic compound comprises methylcyclopentadienyl manganese tricarbonyl.

16. The method of claim 1, wherein the metal manganese-containing compound is a selected from the group consisting of: cyclopentadienyl manganese tricarbonyl, methylcyclopentadienyl manganese tricarbonyl, dimethylcyclopentadienyl manganese tricarbonyl, trimethylcyclopentadienyl manganese tricarbonyl, tetramethylcyclopentadienyl manganese tricarbonyl, pentamethylcyclopentadienyl manganese tricarbonyl, ethylcyclopentadienyl manganese tricarbonyl, diethylcyclopentadienyl manganese tricarbonyl, propylcyclopentadienyl manganese tricarbonyl, isopropylcyclopentadienyl manganese tricarbonyl, tert-butylcyclopentadienyl manganese tricarbonyl, octylcyclopentadienyl manganese tricarbonyl, dodecylcyclopentadienyl manganese tricarbonyl, ethylmethylcyclopentadienyl manganese tricarbonyl, indenyl manganese tricarbonyl, and mixtures of two or more such compounds.

17. The method of claim 1, wherein the emulsion further comprises at least one oxygenates selected from the group consisting of methanol, ethanol, isopropanol, t-butanol, mixed $C_1$ to $C_5$ alcohols, methyl tertiary butyl ether, tertiary amyl methyl ether, ethyl tertiary butyl ether, mixed ethers, glymes, and diglymes.

18. The method of claim 1, wherein the emulsion further comprises an oxygenate.

19. The method of claim 2, wherein the particulate filter comprises a catalyzed diesel particulate filter.

20. The method of claim 2, wherein the diesel particulate filter comprises a continuously regenerating technology diesel particulate filter.

21. The method of claim 1, wherein the emulsion further comprises at least one additive selected from the group consisting of corrosion inhibitors, antioxidants, anti-rust agents, detergents and dispersants, fuel lubricity additives, demulsifiers, dyes, inert diluents, cold flow improvers, conductivity agents, metal deactivators, stabilizers, antifoam additives, de-icers, biocides, odorants, drag reducers, combustion improvers, oxygenates, ammonium nitrate, other ammonium salts, azide compounds, nitrate esters, nitramines, and nitro compounds.

22. A method of improving the operation of a combustion system having a particulate filter, the method comprising the steps of:
   providing a fuel combustion system comprising a particulate filter,
   providing a fuel emulsion comprising ethanol and a fuel, the fuel emulsion comprising a manganese-containing compound,
   wherein the fuel emulsion is free of a platinum group metal selected from the group consisting of platinum, palladium, rhodium, ruthenium, osmium and iridium,
   combusting the fuel emulsion in the fuel combustion system whereby a particulate emission is produced,
   wherein combustion of the fuel emulsion results in improved operation of the combustion system when compared with the operation of the combustion system combusting a fuel emulsion without a manganese-containing compound.

23. A method of reducing backpressure increase caused by the products of the combustion of a fuel in a fuel combustion system that includes a particulate filter, the method comprising the steps of:
provinding a fuel combustion system comprising a particulate filter,
providing a fuel emulsion comprising water and a fuel, the fuel emulsion comprising a manganese-containing compound;
wherein the fuel emulsion is free of a platinum group metal selected from the group consisting of platinum, palladium, rhodium, ruthenium, osmium and iridium,
combusting the fuel emulsion in the fuel combustion system to produce particulate emissions;
wherein the combustion of the fuel emulsion reduces the backpressure increase caused by accumulation of particulates on the particulate filter as compared with the backpressure increase caused by the combustion of a fuel emulsion without a manganese-containing compound.

24. The method of claim 23, wherein the emulsion further comprises an oxygenate.

25. The method of claim 23, wherein the particulate filter comprises a catalyzed diesel particulate filter.

26. The method of claim 23, wherein the diesel particulate filter comprises a continuously regenerating technology diesel particulate filter.

27. The method of claim 23, wherein the emulsion further comprises at least one additiVe selected from the group consisting of corrosion inhibitors, antioxidants, anti-rust agents, detergents and dispersants, fuel lubricity additives, demulsifiers, dyes, inert diluents, cold flow improvers, conductivity agents, metal deactivators, stabilizers, antifoam additives, de-icers, biocides, odorants, drag reducers, combustion improvers, oxygenates, ammonium nitrate, other ammonium salts, azide compounds, nitrate esters, nitramines, and nitro compounds.

28. The method of claim 23, wherein the emulsion further comprises at least one oxygenates selected from the group consisting of methanol, ethanol, isopropanol, t-butanol, mixed $C_1$ to $C_5$ alcohols, methyl tertiary butyl ether, tertiary amyl methyl ether, ethyl tertiary butyl ether, mixed ethers, glymes, and diglymes.

* * * * *